C. F. RUKES.
BED.
APPLICATION FILED AUG. 12, 1914.
1,173,744.
Patented Feb. 29, 1916.
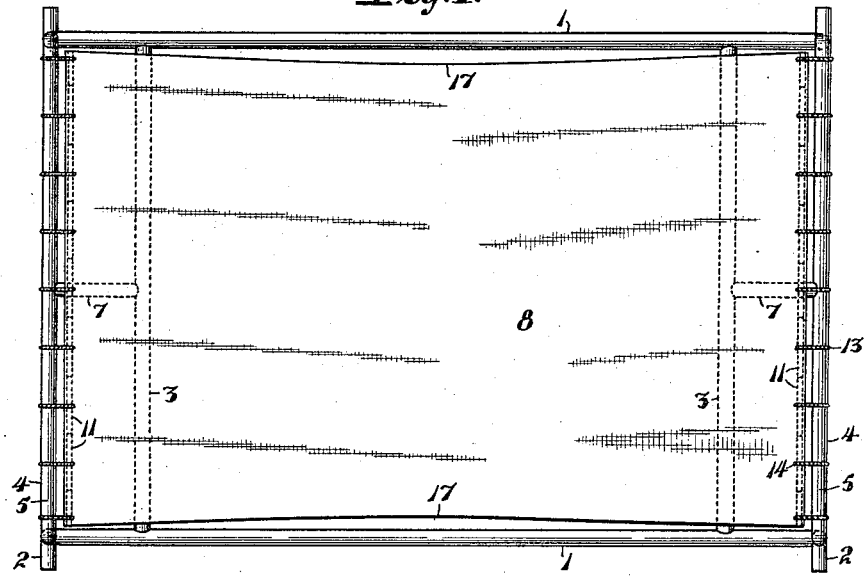
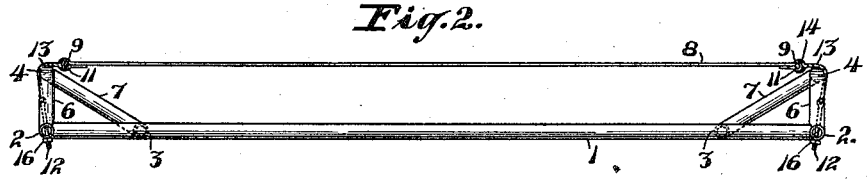
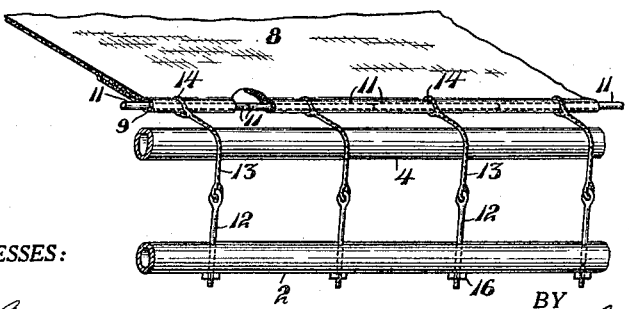
WITNESSES:
INVENTOR,
Charles F. Rukes
BY
ATTORNEY

UNITED STATES PATENT OFFICE.

CHARLES F. RUKES, OF FRESNO, CALIFORNIA.

BED.

1,173,744.

Specification of Letters Patent. Patented Feb. 29, 1916.

Application filed August 12, 1914. Serial No. 856,376.

*To all whom it may concern:*

Be it known that I, CHARLES F. RUKES, a citizen of the United States, residing at Fresno, in the county of Fresno and State of California, have invented new and useful Improvements in Beds, of which the following is a specification.

The present invention relates to improvements in beds, the object of the invention being to provide a bed of cheap and simple construction which will yet be comfortable in use, and the upper surface of which can be made more or less taut, as desired.

In the accompanying drawing, Figure 1 is a plan view of the bed; Fig. 2 is a side view; Fig. 3 is an end view; Fig. 4 is a broken perspective view on an enlarged scale.

Referring to the drawing, 1 indicates two equal and parallel side bars, the ends of which are connected to equal and parallel end bars 2, said bars 1 and 2 thus forming a rectangular frame. Said side bars are also connected near their ends by transverse bars 3. Upon the end bars 2 are erected yokes 4, the central horizontal portion or bar 5 of each of which is substantially of the same length as the end bars, while its side members 6 are of a height much shorter than its length. The center of each yoke is connected to one end of a brace 7, the other end of which is connected to the center of the adjacent transverse bar 3.

8 indicates a sheet of canvas or any other suitable material of a size but little smaller than that of the frame formed by the side and end bars. The ends of said sheet are formed with hems or loops 9 in which are short rods 11; in alinement with each other. Through apertures in the end bars 2 are passed eye-bolts 12, one for each rod, to the eyes of which are attached cords or ties 13, which extend around the center members of the yokes 4, and terminate in loops 14, which are looped around said members and the terminal portions of the sheet surrounding the same, passing through apertures in the sheet. On the lower ends of said eye-bolts are screwed nuts 16.

It will readily be seen that any part of the sheet can be made as taut or loose as desired, by screwing or unscrewing nuts on eye-bolts at the top and bottom of said portion of the sheet. Consequently should the sheet tend to become slack through much use it can be tightened up whenever desired.

The sheet is not truly rectangular but its inner edges 17 are slightly concave, that is to say, it is narrower in the center than at the ends. The sheet is given this form in order to counteract its tendency to sag at the side edges. By screwing up the nuts on the bolts through the end portions of the end bars, these side edges can always be kept tight.

It will thus be seen that I obtain a very simple and economical construction of bed, which is at the same time comfortable in use, possessing the advantages of a hammock in that the supporting surface of the bed conforms to the surface of the human body, while at the same time being free from the disadvantage inherent in a hammock, in that the surface of the bed is flat both longitudinally and transversely, permitting the occupant to move from side to side easily and without constraint.

I claim:—

1. In combination, a rectangular frame, a sheet of flexible material having hems at one end, a plurality of rods in each hem in alinement with each other, flexible ties severally secured at one end to said rods, devices severally secured to the other ends of the ties and to the frame, and individual means for extending or contracting the portions of said devices between said ties and frame.

2. In combination, a rectangular frame, a bar supported above an end portion of said frame, a sheet of flexible material having a hem at the end adjacent to said bar, a plurality of rods in said hem in alinement with each other, flexible ties extending around said bar and secured at one end to the respective rods, bolts through said end of the frame and connected at one end respectively to the other ends of said flexible ties, and nuts screwed on the other ends of said bolts.

In testimony whereof I have hereunto set my hand in the presence of two subscribing witnesses.

CHARLES F. RUKES.

Witnesses:
F. M. WRIGHT,
D. B. RICHARDS.

Copies of this patent may be obtained for five cents each, by addressing the "Commissioner of Patents, Washington, D. C."